United States Patent
Kim et al.

(10) Patent No.: US 11,170,239 B2
(45) Date of Patent: Nov. 9, 2021

(54) ELECTRONIC APPARATUS AND OPERATION METHOD THEREOF

(71) Applicant: LG ELECTRONICS INC., Seoul (KR)

(72) Inventors: Hyunkyu Kim, Seoul (KR); Kibong Song, Seoul (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 16/730,895

(22) Filed: Dec. 30, 2019

(65) Prior Publication Data

US 2020/0134334 A1    Apr. 30, 2020

(30) Foreign Application Priority Data

Nov. 19, 2019    (KR) ........................ 10-2019-0148568

(51) Int. Cl.
| | |
|---|---|
| *G06K 9/00* | (2006.01) |
| *G06N 20/00* | (2019.01) |
| *G06N 3/08* | (2006.01) |
| *G10L 15/18* | (2013.01) |
| *G10L 15/16* | (2006.01) |
| *G05D 1/00* | (2006.01) |
| *G01C 21/32* | (2006.01) |
| *G10L 15/22* | (2006.01) |

(52) U.S. Cl.
CPC ..... *G06K 9/00832* (2013.01); *G06K 9/00335* (2013.01); *G06K 9/00671* (2013.01); *G06N 3/08* (2013.01); *G06N 20/00* (2019.01); *G01C 21/32* (2013.01); *G05D 1/0088* (2013.01); *G05D 2201/0213* (2013.01); *G10L 15/16* (2013.01); *G10L 15/1815* (2013.01); *G10L 15/22* (2013.01)

(58) Field of Classification Search
CPC .......... G06K 9/00832; G06K 9/00671; G06K 9/00335; G06N 20/00; G06N 3/08; G06N 3/006; G05D 2201/0213; G05D 1/0088; G10L 15/1815; G10L 15/22; G10L 15/16; G01C 21/32
See application file for complete search history.

(56) References Cited

U.S. PATENT DOCUMENTS

| | | | | |
|---|---|---|---|---|
| 2009/0304230 A1* | 12/2009 | Krahnstoever | ......... | G06T 7/292 382/103 |
| 2011/0084807 A1* | 4/2011 | Logan | .................... | G08B 21/22 340/10.1 |
| 2016/0006577 A1* | 1/2016 | Logan | .................... | G05B 15/02 700/276 |

(Continued)

FOREIGN PATENT DOCUMENTS

KR    1020150106257    9/2015

*Primary Examiner* — Carol Wang
(74) *Attorney, Agent, or Firm* — Lee, Hong, Degerman, Kang & Waimey

(57) ABSTRACT

Provided are a method for setting an owner of an object based on sensing information regarding an internal environment of a vehicle when the object comes apart from a passenger, and an electronic apparatus therefor. In the present disclosure, one or more of an electronic apparatus, a vehicle, a vehicular terminal, and the autonomous driving vehicle may be associated with an artificial intelligence module, an unmanned aerial vehicle (UAV), a robot, an augmented reality (AR) device, a virtual reality (VR) device, a 5G service-related device, and the like.

18 Claims, 14 Drawing Sheets

(56) References Cited

U.S. PATENT DOCUMENTS

| | | | |
|---|---|---|---|
| 2016/0154100 A1* | 6/2016 | Giovannini | A61H 3/061 |
| | | | 342/463 |
| 2017/0098364 A1* | 4/2017 | Jaegal | G08B 21/24 |
| 2019/0147393 A1* | 5/2019 | McCafferty | G06Q 30/0208 |
| | | | 340/572.1 |
| 2019/0251376 A1* | 8/2019 | Stoffel | H04W 4/44 |
| 2019/0259165 A1* | 8/2019 | Watanabe | G06K 9/00771 |
| 2020/0043174 A1* | 2/2020 | Togashi | H04N 7/181 |
| 2020/0193166 A1* | 6/2020 | Russo | G06T 7/194 |

* cited by examiner

ELECTRONIC APPARATUS AND OPERATION METHOD THEREOF

CROSS-REFERENCE TO RELATED APPLICATION

Pursuant to 35 U.S.C § 119(a), this application claims the benefit of earlier filing date and right of priority to Korean Patent Application No. 10-2019-0148568, filed on Nov. 19, 2019, the contents of which are all hereby incorporated by reference herein in its entirety.

BACKGROUND

1. Field

The present disclosure relates to a method for setting an owner of an object present in a vehicle and an electronic apparatus for the same.

2. Description of the Related Art

There are some cases where a passenger loses an item or gets an item stolen in a vehicle. In order to prevent such cases, it is necessary to effectively set an owner of an item present in the vehicle.

In addition, an autonomous vehicle refers to a vehicle having an autonomous driving device capable of recognizing a surrounding environment and a vehicle state and controlling driving of the vehicle accordingly. With researches on the autonomous vehicle, there are also efforts being made to research and study a variety of services to improve user convenience using the autonomous vehicle.

SUMMARY

An aspect provides an electronic apparatus and an operation method thereof. Technical objects of embodiments of the present disclosure are not limited to the above object, and other objects can be deduced from the following embodiments.

According to an aspect, there is provided an operation method of an electronic apparatus. The method includes acquiring sensing information regarding an object present in a vehicle and sensing information regarding a motion of a passenger carrying the object, based on the acquired sensing information, setting an owner of the object when the object comes apart from the passenger, and, when a predetermined situation occurs, providing the owner of the object with information regarding the object.

According to another aspect, there is also provided an electronic apparatus including an interface configured to acquire sensing information regarding an object present in a vehicle and sensing information regarding a motion of a passenger carrying the object, and a controller configured to, based on the acquired sensing information, set an owner of the object when the object comes apart from the passenger, and, in response to occurrence of a predetermined situation, provide the owner of the object with information regarding the object through an output part.

In another general aspect, there is also provided a non-volatile computer-readable recording medium for storing a program to implement the aforementioned in a computer.

Details of the embodiments are included in the detailed description and the accompanying drawings.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
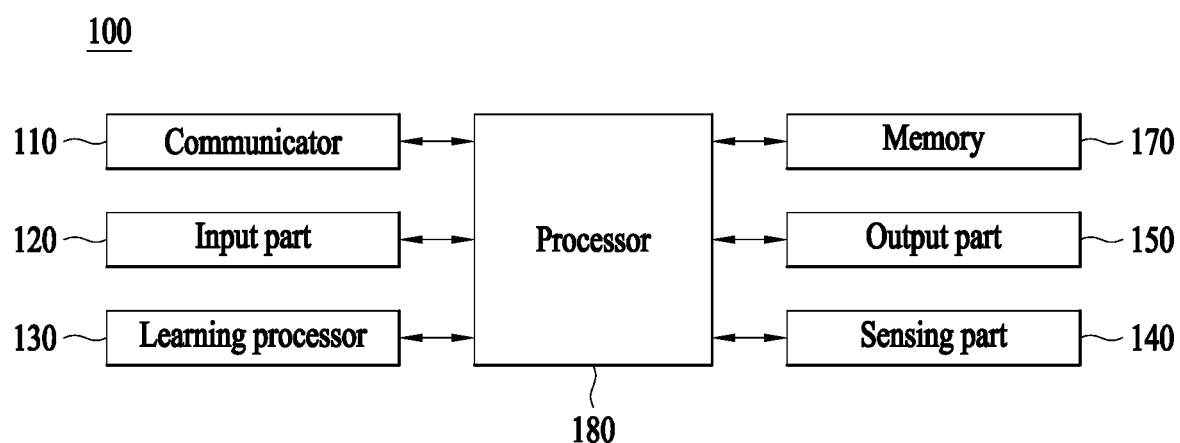
FIG. 1 illustrates an artificial intelligence (AI) device according to an example embodiment.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergency of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

In addition, in this specification, "artificial Intelligence (AI)" refers to the field of studying artificial intelligence or a methodology capable of making the artificial intelligence, and "machine learning" refers to the field of studying methodologies that define and solve various problems handled in the field of artificial intelligence. The machine learning is also defined as an algorithm that enhances performance for a certain operation through a steady experience with respect to the operation.

An "artificial neural network (ANN)" may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

In addition, in this specification, a vehicle may be an autonomous vehicle. "Autonomous driving" refers to a self-driving technology, and an "autonomous vehicle" refers to a vehicle that performs driving without a user's operation or with a user's minimum operation. In addition, the autonomous vehicle may refer to a robot having an autonomous driving function.

For example, autonomous driving may include all of a technology of maintaining the lane in which a vehicle is driving, a technology of automatically adjusting a vehicle speed such as adaptive cruise control, a technology of causing a vehicle to automatically drive in a given route, and a technology of automatically setting a route, along which a vehicle drives, when a destination is set.

Here, a vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

FIG. 1 illustrates an AI device according to an example embodiment.

The AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, a vehicle, or an X reality (XR) device.

Referring to FIG. 1, the AI device 100 may include a communicator 110, an input part 120, a learning processor 130, a sensing part 140, an output part 150, a memory 170, and a processor 180. However, not all components shown in FIG. 1 are essential components of the AI device 100. The AI device may be implemented by more components than those illustrated in FIG. 1, or the AI device may be implemented by fewer components than those illustrated in FIG. 1.

The communicator 110 may transmit and receive data to and from external devices, such as other AI devices 100a to 100e and an AI server 200, using wired/wireless communication technologies. For example, the communicator 110 may transmit and receive sensor information, user input, learning models, and control signals, for example, to and from external devices.

At this time, the communication technology used by the communicator 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

The input part 120 may acquire various types of data.

At this time, the input part 120 may include a camera for the input of an image signal, a microphone for receiving an audio signal, and a user input part for receiving information input by a user, for example. Here, the camera or the microphone may be handled as a sensor, and a signal acquired from the camera or the microphone may be referred to as sensing data or sensor information.

The input part 120 may acquire, for example, input data to be used when acquiring an output using learning data for model learning and a learning model. The input part 120 may acquire unprocessed input data, and in this case, the processor 180 or the learning processor 130 may extract an input feature as pre-processing for the input data.

The learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, the learning processor 130 may perform AI processing along with a learning processor 240 of the AI server 200.

At this time, the learning processor 130 may include a memory integrated or embodied in the AI device 100. Alternatively, the learning processor 130 may be realized using the memory 170, an external memory directly coupled to the AI device 100, or a memory held in an external device.

The sensing part 140 may acquire at least one of internal information of the AI device 100, environmental information around the AI device 100, and user information using various sensors.

At this time, the sensors included in the sensing part 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and a temperature sensor, for example.

The output part 150 may generate, for example, a visual output, an auditory output, or a tactile output.

At this time, the output part 150 may include, for example, a display that outputs visual information, a speaker that outputs auditory information, and a haptic module that outputs tactile information.

The memory 170 may store data which assists various functions of the AI device 100. For example, the memory 170 may store input data acquired by the input part 120, learning data, learning models, and learning history, for example. The memory 170 may include a storage medium of at least one type among a flash memory, a hard disk, a multimedia card micro type memory, a card type memory (e.g., SD or XD memory), a random access memory (RAM) a static random access memory (SRAM), a read only memory (ROM), an electrically erasable programmable read-only memory (EEPROM), a programmable read-only memory (PROM), a magnetic memory, a magnetic disc, and an optical disc.

The processor 180 may determine at least one executable operation of the AI device 100 based on information determined or generated using a data analysis algorithm or a machine learning algorithm. Then, the processor 180 may control constituent elements of the AI device 100 to perform the determined operation.

To this end, the processor 180 may request, search, receive, or utilize data of the learning processor 130 or the memory 170, and may control the constituent elements of the AI device 100 so as to execute a predictable operation or an operation that is deemed desirable among the at least one executable operation.

At this time, when connection of an external device is required to perform the determined operation, the processor 180 may generate a control signal for controlling the external device and may transmit the generated control signal to the external device.

The processor 180 may acquire intention information with respect to user input and may determine a user request based on the acquired intention information.

At this time, the processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by the learning processor 130, may have learned by a learning processor 240 of the AI server 200, or may have learned by distributed processing of these processors.

The processor 180 may collect history information including, for example, the content of an operation of the AI device 100 or feedback of the user with respect to an operation, and may store the collected information in the memory 170 or the learning processor 130, or may transmit the collected information to an external device such as the AI server 200. The collected history information may be used to update a learning model.

The processor 180 may control at least some of the constituent elements of the AI device 100 in order to drive an application program stored in the memory 170. Moreover, the processor 180 may combine and operate two or more of the constituent elements of the AI device 100 for the driving of the application program.

Figure 2:
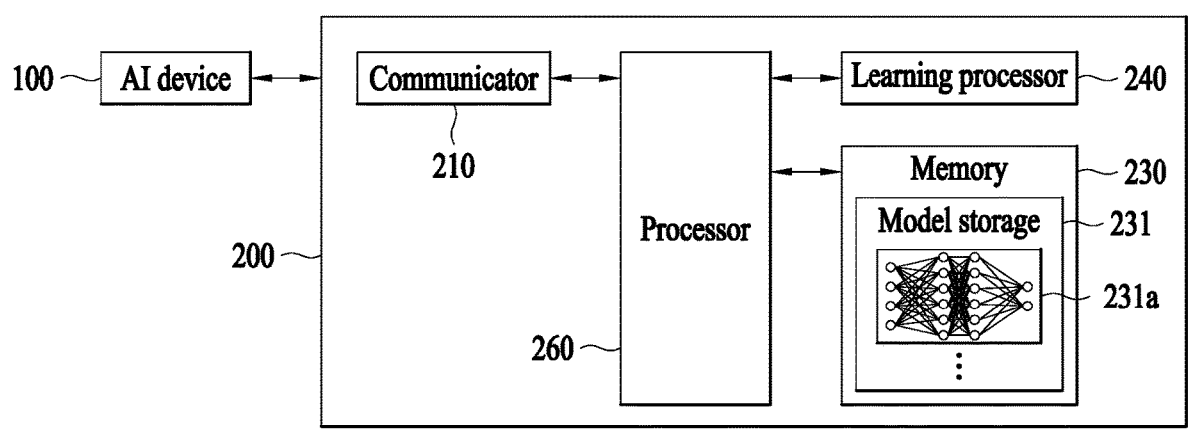
FIG. 2 illustrates an AI server according to an example embodiment.

FIG. 2 illustrates an AI server according to an example embodiment.

Referring to FIG. 2, an AI server 200 may refer to a device that causes an artificial neural network to learn using a machine learning algorithm or uses the learned artificial neural network. Here, the AI server 200 may be constituted of multiple servers to perform distributed processing, and may be defined as a 5G network. At this time, the AI server 200 may be included as a constituent element of the AI device 100 so as to perform at least a part of AI processing together with the AI device.

The AI server 200 may include a communicator 210, a memory 230, a learning processor 240, and a processor 260.

The communicator 210 may transmit and receive data to and from an external device such as the AI device 100.

The memory 230 may include a model storage 231. The model storage 231 may store a model (or an artificial neural network 231a) which is learning or has learned via the learning processor 240.

The learning processor 240 may cause the artificial neural network 231a to learn learning data. A learning model may be used in the state of being mounted in the AI server 200 of the artificial neural network, or may be used in the state of being mounted in an external device such as the AI device 100.

The learning model may be realized in hardware, software, or a combination of hardware and software. In the case in which a part or the entirety of the learning model is realized in software, one or more instructions constituting the learning model may be stored in the memory 230.

The processor 260 may deduce a result value for newly input data using the learning model, and may generate a response or a control instruction based on the deduced result value.

Figure 3:
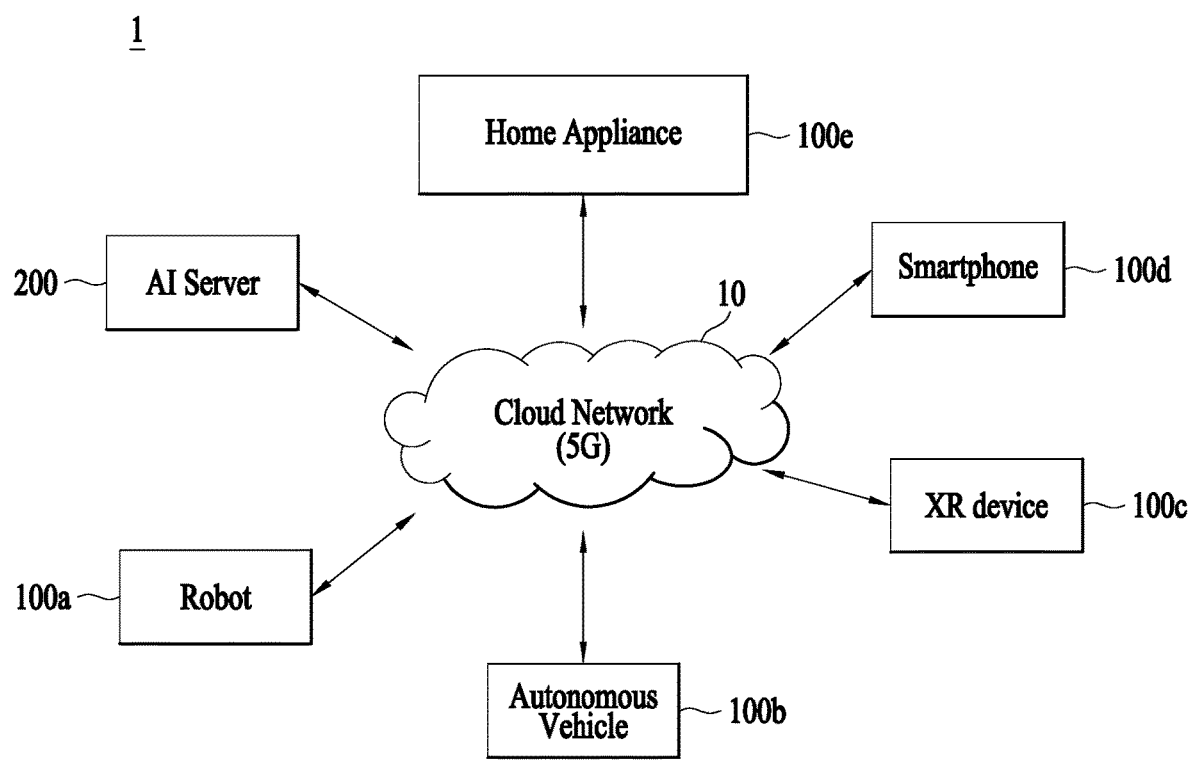
FIG. 3 illustrates an AI system according to an example embodiment.

FIG. 3 illustrates an AI system according to an example embodiment.

Referring to FIG. 3, in the AI system 1, at least one of the AI server 200, a robot 100a, an autonomous vehicle 100b, an XR device 100c, a smart phone 100d, and a home appliance 100e is connected to a cloud network 10. Here, the robot 100a, the autonomous vehicle 100b, the XR device 100c, the smart phone 100d, and the home appliance 100e, to which AI technologies are applied, may be referred to as AI devices 100a to 100e.

The cloud network 10 may constitute a part of a cloud computing infra-structure, or may refer to a network present in the cloud computing infra-structure. Here, the cloud network 10 may be configured using a 3G network, a 4G or long term evolution (LTE) network, or a 5G network, for example.

That is, respective devices 100*a* to 100*e* and 200 constituting the AI system 1 may be connected to each other via the cloud network 10. In particular, respective devices 100*a* to 100*e* and 200 may communicate with each other via a base station, or may perform direct communication without the base station.

The AI server 200 may include a server which performs AI processing and a server which performs an operation with respect to big data.

The AI server 200 may be connected to at least one of the robot 100*a*, the autonomous vehicle 100*b*, the XR device 100*c*, the smart phone 100*d*, and the home appliance 100*e*, which are AI devices constituting the AI system 1, via cloud network 10, and may assist at least a part of AI processing of connected the AI devices 100*a* to 100*e*.

At this time, instead of the AI devices 100*a* to 100*e*, the AI server 200 may cause an artificial neural network to learn according to a machine learning algorithm, and may directly store a learning model or may transmit the learning model to the AI devices 100*a* to 100*e*.

At this time, the AI server 200 may receive input data from the AI devices 100*a* to 100*e*, may deduce a result value for the received input data using the learning model, and may generate a response or a control instruction based on the deduced result value to transmit the response or the control instruction to the AI devices 100*a* to 100*e*.

Alternatively, the AI devices 100*a* to 100*e* may directly deduce a result value with respect to input data using the learning model, and may generate a response or a control instruction based on the deduced result value.

Hereinafter, various example embodiments of the AI devices 100*a* to 100*e*, to which the above-described technology is applied, will be described. Here, the AI devices 100*a* to 100*e* illustrated in FIG. 3 may be specific example embodiments of the AI device 100 illustrated in FIG. 1.

The autonomous vehicle 100*b* may be realized into a mobile robot, a vehicle, or an unmanned air vehicle, for example, through the application of AI technologies.

The autonomous vehicle 100*b* may include an autonomous driving control module for controlling an autonomous driving function, and the autonomous driving control module may mean a software module or a chip realized in hardware. The autonomous driving control module may be a constituent element included in the autonomous vehicle 1200*b*, but may be a separate hardware element outside the autonomous vehicle 1200*b* so as to be connected thereto.

The autonomous vehicle 100*b* may acquire information on the state of the autonomous vehicle 1200*b* using sensor information acquired from various types of sensors, may detect or recognize the surrounding environment and an object, may generate map data, may determine a movement route and a driving plan, or may determine an operation.

Here, the autonomous vehicle 100*b* may use sensor information acquired from at least one sensor among a lidar, a radar, and a camera in the same manner as the robot 1200*a* in order to determine a movement route and a driving plan.

In particular, the autonomous vehicle 100*b* may recognize the environment or an object with respect to an area outside the field of vision or an area located at a predetermined distance or more by receiving sensor information from external devices, or may directly receive recognized information from external devices.

The autonomous vehicle 100*b* may perform the above-described operations using a learning model configured with at least one artificial neural network. For example, the autonomous vehicle 100*b* may recognize the surrounding environment and the object using the learning model, and may determine a driving line using the recognized surrounding environment information or object information. Here, the learning model may be directly learned in the autonomous vehicle 100*b*, or may be learned in an external device such as the AI server 200.

At this time, the autonomous vehicle 100*b* may generate a result using the learning model to perform an operation, but may transmit sensor information to an external device such as the AI server 200 and receive a result generated by the external device to perform an operation.

The autonomous vehicle 100*b* may determine a movement route and a driving plan using at least one of map data, object information detected from sensor information, and object information acquired from an external device, and a drive part may be controlled to drive the autonomous vehicle 100*b* according to the determined movement route and driving plan.

The map data may include object identification information for various objects arranged in a space (e.g., a road) along which the autonomous vehicle 100*b* drives. For example, the map data may include object identification information for stationary objects, such as streetlights, rocks, and buildings, and movable objects such as vehicles and pedestrians. Then, the object identification information may include names, types, distances, and locations, for example.

In addition, the autonomous vehicle 100*b* may perform an operation or may drive by controlling the drive part based on user control or interaction. At this time, the autonomous vehicle 100*b* may acquire interactional intention information depending on a user operation or voice expression, and may determine a response based on the acquired intention information to perform an operation.

Figure 4:
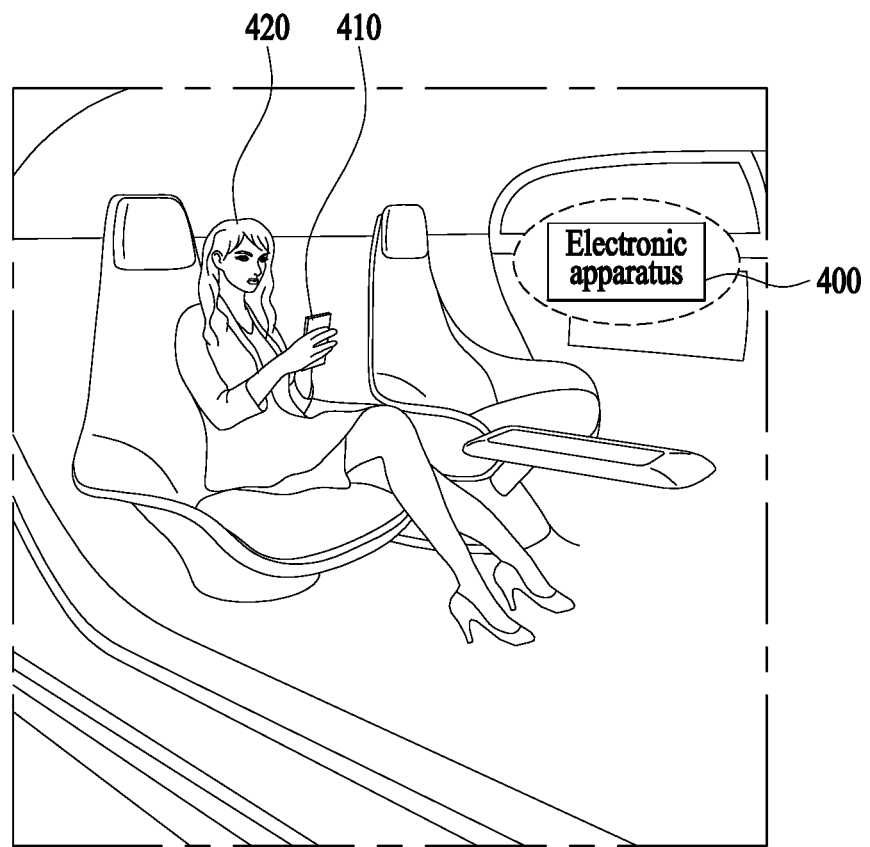
FIG. 4 illustrates an embodiment in which an electronic apparatus operates.

FIG. 4 illustrates an embodiment in which an electronic apparatus operates.

According to an embodiment, an electronic apparatus 400 may be included in a vehicle and may be, for example, a vehicular terminal included in an autonomous vehicle. According to another embodiment, the electronic apparatus 400 may not be included in a vehicle and may be, for example, included in a sever.

The electronic apparatus 400 may acquire sensing information regarding an internal environment of a vehicle. Specifically, the electronic apparatus 400 may acquire sensing information regarding an object 410 present in the vehicle from a sensor mounted to the vehicle, and sensing information regarding an operation of a passenger 420 carrying the object 410.

When it is determined, based on acquired sensing information, that the object 410 comes apart from the passenger 420, the electronic apparatus 400 may set an owner of the object 410. Specifically, based on sensing information regarding motions of the object 410 and the passenger 420, the electronic vehicle 400 may recognize a situation in which the object 410 comes apart from or is separated from the passenger 420, and may set an owner of the object 410.

According to an embodiment, the electronic apparatus 400 may recognize a motion of the passenger 420 putting down the object 410, prior to a point in time at which the object 410 comes apart from the passenger 420. As a result, the electronic apparatus 400 may set the passenger 420 as the owner of the object 410. According to another embodiment, the electronic apparatus 400 may recognize a motion of the passenger 420 handing over the object to another passenger. As a result, the electronic apparatus 400 may set the other passenger as the owner of the object 410.

When a predetermined situation occurs, the electronic device 400 may provide information regarding the object 410 to the owner of the object 410. According to an embodiment, when the passenger 420, who is the owner of the object 410, gets off the vehicle with the object 410 left in the vehicle, the electronic apparatus 400 may provide the information regarding the object 410 to the passenger 420. For example, through an audio output part provided in the vehicle, the electronic device 400 may provide the information regarding the object 410 corresponding to a lost item to the passenger 420 who is the owner of the object 410. According to another embodiment, when a different passenger other than the owner of the object 410 gets off the vehicle while carrying the object 410, the electronic apparatus 400 may provide the information regarding the object 410 to the passenger 420. For example, through a display provided in a terminal of the passenger 420, the electronic apparatus 400 may provide the information regarding the object 410, which is a stolen item, to the passenger 420 who is the owner of the object 410.

Figure 5:
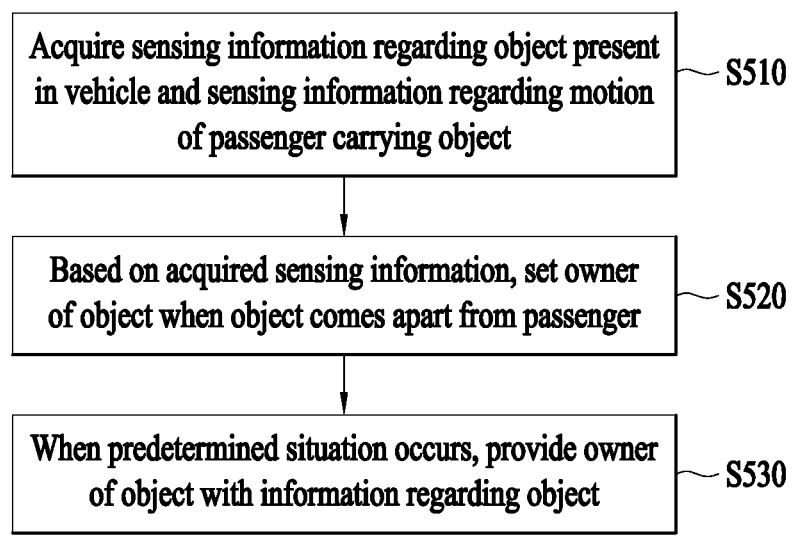
FIG. 5 illustrates an embodiment of a flowchart illustrating an operation of an electronic apparatus.

FIG. 5 illustrates an embodiment of a flowchart illustrating an operation of an electronic apparatus.

In operation S510, an electronic apparatus 400 may acquire sensing information regarding an object present in a vehicle and sensing information regarding a motion of a passenger carrying the object.

According to an embodiment, at least one sensor in the vehicle may sense an object present in the vehicle and transmit sensing information regarding the object to the electronic apparatus 400. The sensing information regarding the object may include information regarding a shape, a type, and a location of the object. At least one sensor in the vehicle may include a camera. In addition, at least one sensor may sense a motion of a passenger carrying the object and transmit sensing information regarding the motion of the passenger to the electronic apparatus 400. The sensing information regarding the motion of the passenger may include information regarding movement of a hand or arm of the passenger.

According to another embodiment, the electronic apparatus 400 may include at least one sensor and therefore may acquire, through the at least one sensor, sensing information regarding an object present in the vehicle and sensing information regarding a motion of a passenger carrying the object. According to yet another embodiment, the electronic apparatus 400 may acquire, from a memory, sensing information regarding an object present in a vehicle and sensing information regarding a motion of a passenger carrying the object, each type of the sensing information stored in the memory.

In operation S520, the electronic apparatus 400 may set an owner of the object based on the sensing information, acquired in operation S510, when the object comes apart from the passenger.

Based on the sensing information acquired in operation S510, the electronic apparatus 400 may recognize a situation in which the object comes apart from the passenger. Specifically, based on the sensing information regarding the object and the sensing information regarding the motion of the passenger carrying the object, the electronic apparatus 400 may recognize separation of the object from a hand of the passenger and accordingly determine that the object comes apart from the passenger.

The electronic apparatus 400 may set an owner of an object according to a situation in which the objects comes apart from a passenger. According to an embodiment, the electronic apparatus 400 may determine whether a motion of the passenger putting down an object has occurred prior to a point in time at which the object comes apart from the passenger, and, when it is determined that the motion of the passenger putting down the object has occurred prior to the point in time, the electronic apparatus 400 may set the passenger as the owner of the object. According to another embodiment, when a motion of the passenger handing over the object to another passenger prior to a point in time at which the object comes apart from the passenger, the electronic apparatus 400 may set the other passenger as the owner of the object. According to yet another embodiment, the electronic apparatus 400 may not set the owner of the object according to a situation in which the object comes apart from the passenger. For example, when it is recognized that the passenger abandons the object, the electronic apparatus 400 may not set the owner of the object.

The electronic apparatus 400 may set the owner of the object based on a type of the object when the object comes apart from the passenger. For example, when the object is a connected device in wired or wireless connection with a seat of the passenger, the electronic apparatus 400 may set the passenger as the owner of the object.

In operation S530, the electronic apparatus 400 may provide information regarding the object to the owner of the object when a predetermined situation occurs.

According to an embodiment, the electronic apparatus 400 may recognize a situation in which the object is left in the vehicle when the owner of the object gets off from the vehicle, and may provide the information regarding the object to the owner of the object. For example, the electronic apparatus 400 may provide the owner of the object with information indicating that the object is lost in the vehicle. According to another embodiment, the electronic apparatus 400 may recognize a situation in which the owner of the object remains in the vehicle when the object is out of the vehicle. In this case, the electronic apparatus 400 may provide the information regarding the object to the owner of the object. For example, the electronic apparatus 400 may provide the owner of the object with information indicating that the object is stolen by another passenger.

According to an embodiment, the electronic apparatus 400 may provide the owner of the object with the information regarding the object through an output part mounted to the vehicle. For example, the electronic apparatus 400 may provide the owner of the object with the information regarding the object through an image output part or audio output part mounted to the vehicle. According to another embodiment, the electronic apparatus 400 may provide the owner of the object with the information regarding the object through a device possessed by the owner of the object. For example, the electronic apparatus 400 may provide the owner of the object with the information regarding the object through a smart phone possessed by the owner of the object.

When a first passenger other than the owner of the object gets of the vehicle while carrying the object, the electronic apparatus 400 may provide the first passenger with the information regarding the object. For example, the electronic apparatus 400 may provide the first passenger with information indicating that the first passenger gets off the vehicle while carrying the object without an authority.

The electronic apparatus 400 may recognize a situation in which the object is left in the vehicle when the owner of the object gets off the vehicle, and may transmit information regarding the object to an external device. For example, the electronic apparatus 400 may transmit, to the external device, information indicating that the object is lost. The electronic apparatus 400 may transmit, to the external apparatus, information regarding an object of which an owner is not set. For example, in order to get rid of an object of which an owner is not set, the electronic apparatus 400 may transmit information regarding the object to a cleaning device.

Accordingly, based on sensing information regarding an internal environment of a vehicle, the electronic apparatus 400 may accurately set an owner of an object apart from a passenger, thereby improving convenience of the passenger. For example, the electronic apparatus 400 may accurately set an owner of a lost object and provide the owner of the object with information regarding the lost object. In addition, as the electronic apparatus 400 determines intention of a passenger regarding an object apart from the passenger and sets an owner of the object based on the intention of the passenger, thereby enabling more accurate setting of the owner. For example, when an object comes apart from a passenger, the electronic apparatus 400 may determine whether the passenger abandons the object on purpose, and, when it is determined that the passenger abandons the object on purpose, the electronic apparatus 400 may not set the owner of the object.

Figure 6:
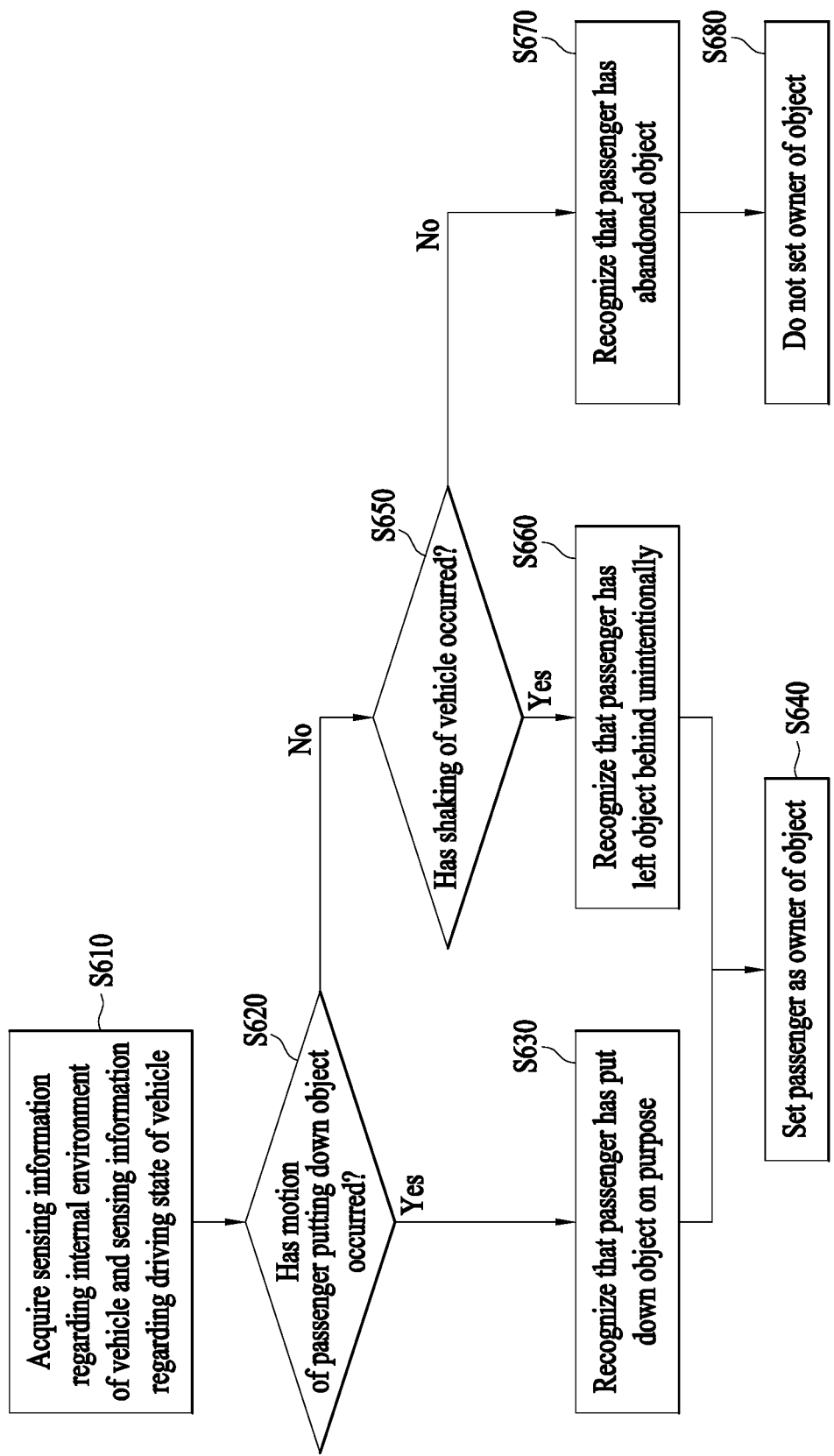
FIG. 6 illustrates an embodiment in which an electronic apparatus sets an owner of an object.

FIG. 6 illustrates an embodiment in which an electronic apparatus sets an owner of an object.

In operation S610, an electronic apparatus 400 may acquire sensing information regarding an internal environment of a vehicle and sensing information regarding a driving state of the vehicle. According to an embodiment, through at least one sensor in the vehicle, the electronic apparatus 400 may acquire sensing information regarding an object, sensing information regarding a motion of a passenger carrying the object, and sensing information regarding a driving state of the vehicle. For example, the electronic apparatus 400 may acquire information regarding the object, sensing information regarding a motion of the passenger, and sensing information regarding an accessory attached to the body of the passenger through a camera in the vehicle, and may acquire sensing information regarding a driving state of the vehicle through a GPS sensor and an acceleration sensor in the vehicle. In another example, the electronic apparatus 400 may acquire information regarding a shaking state of the vehicle through an auto-labeling sensor and an impact sensor. In addition, the electronic apparatus 400 may acquire sensing information regarding a motion of another passenger present in the vehicle through at least one sensor in the vehicle.

In operation S620, the electronic apparatus 400 may determine whether a motion of the passenger putting down the object has occurred prior to a point in time at which the object comes apart from the passenger. Specifically, based on sensing information regarding the object and sensing information regarding the motion of the passenger, the electronic apparatus 400 may recognize the point in time at which the object comes apart from the object and may determine whether the motion of the passenger putting down the object has occurred the point in time. Through movement of the hand or arm of the passenger, the electronic apparatus 400 may recognize a hand or arm of the passenger and may recognize a motion of the passenger putting down the object. The electronic apparatus 400 may recognize the hand or arm of the passenger and recognize the motion of the passenger putting down the object based on movement of the hand or arm of the passenger. For example, through an artificial intelligence model for recognizing a motion of a person putting down an object, the electronic apparatus 400 may recognize the motion of the passenger putting down the object. For example, through a pre-trained deep learning model, the electronic apparatus 400 may recognize the motion of the passenger putting down the object. In addition, based on sensing information regarding a motion of the passenger, the electronic apparatus 400 may train a deep learning model and recognize the motion of the passenger putting down the object through the trained deep learning model.

When it is determined, based on sensing information regarding an object and sensing information regarding a motion of a passenger carrying the object, that a motion of the passenger is recognized but the presence of the object is not recognized, the electronic apparatus 400 may determine that a motion of the passenger putting down the object does not occur. For example, when the passenger makes a motion of putting an object in a pocket of the passenger, the presence of the object is not recognized through a camera and therefore the electronic apparatus 400 may determine that a motion of the passenger putting down the object does not occur.

When it is determined in operation S620 that a motion of the passenger putting down the object has occurred prior to a point in time at which the object comes apart from the passenger, the electronic apparatus 400 may recognize in operation S630 that the passenger puts down the object on purpose. As it is recognized that the passenger has put down the object on purpose, the electronic apparatus 400 may set the passenger as the owner of the object in operation S640.

When it is determined in operation S620 that a motion of the passenger putting down the object has not occurred prior to the point in time at which the object comes apart from the passenger, the electronic apparatus 400 may determine in operation S650 as to whether shaking of the vehicle has occurred prior to the point in time at which the object comes apart from the passenger. Specifically, based on sensing information regarding a driving state of the vehicle, the electronic apparatus 400 may determine whether a degree of shaking of the vehicle exceeds a preset threshold. Based on controller area network (CAN) data regarding a driving state of the vehicle prior to the point in time at which the object comes apart from the passenger, the electronic apparatus 400 may determine whether the degree of shaking of the vehicle exceeds the preset threshold. For example, when it is determined, based on a sensing result of auto-leveling of the vehicle or a sensing result of an impact against the vehicle, that the degree of shaking of the vehicle exceeds the preset threshold, the electronic apparatus 400 may determine that shaking of the vehicle has occurred.

When it is determined in operation S650 that shaking of the vehicle has occurred prior to the point in time at which the object comes apart from the passenger, the electronic apparatus 400 may recognize in operation S660 that the passenger has dropped the object unintentionally. As it is recognized that the passenger has dropped the object on purpose, the electronic apparatus 400 may set the passenger as the owner of the object in operation S640.

When it is determined in operation S650 that shaking of the vehicle has not occurred prior to the point in time at which the object comes apart from the passenger, the electronic apparatus 400 may recognize in operation S670 that the passenger abandons the object on purpose. In addition, as the electronic apparatus 400 recognizes in operation S680 that the passenger has abandoned the object on purpose, the electronic apparatus 400 may not set the owner of the object.

Figure 7:
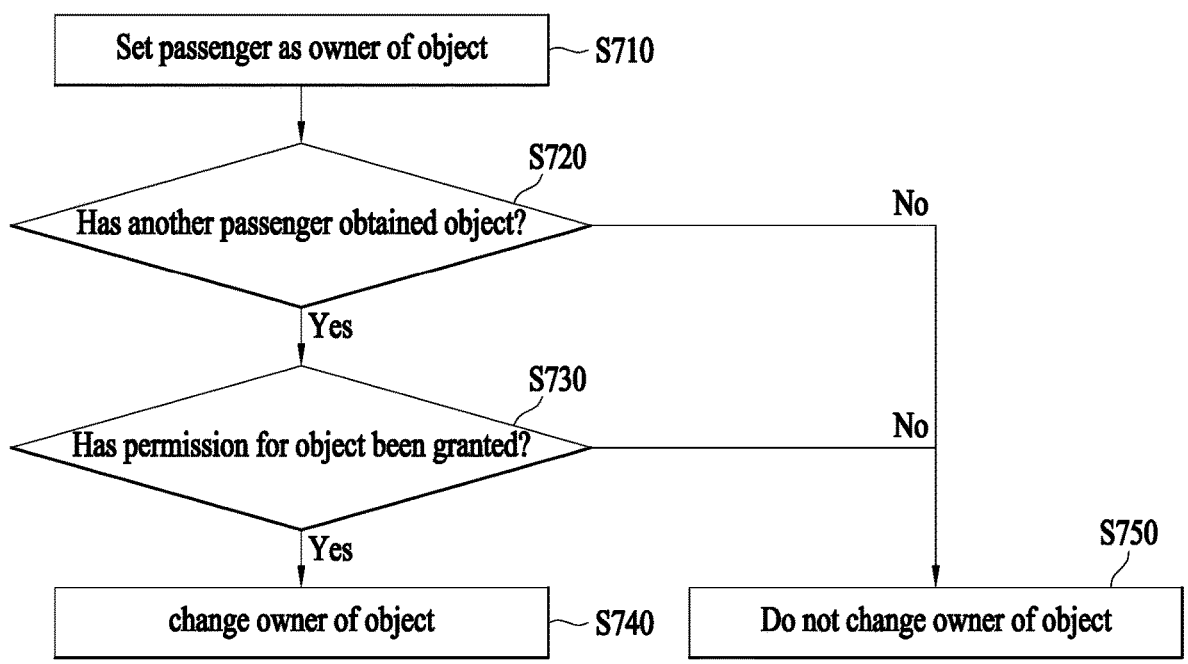
FIG. 7 illustrates an embodiment in which an electronic apparatus changes an owner of an object.

FIG. 7 illustrates an embodiment in which an electronic apparatus changes an owner of an object.

In operation S710, an electronic apparatus 400 may set a passenger as an owner of an object. In one embodiment, when it is recognized that the passenger has the object, the electronic apparatus 400 may set the passenger as the owner of the object. In another embodiment, when it is recognized that the passenger puts down the object on purpose or comes apart the object unintentionally, the electronic apparatus 400 may set the passenger as the owner of the object.

In operation S720, the electronic apparatus 400 may determine whether another passenger has obtained the object. Specifically, based on sensing information regarding an internal environment of the vehicle, the electronic apparatus 400 may determine whether another passenger has obtained an object belonging to a passenger. In one example, the electronic apparatus 400 may recognize a motion of the other passenger picking up an object which is put down or dropped by the passenger who is the owner of the object, and accordingly, the electronic apparatus 400 may recognize that the other passenger has obtained the object. In another example, the electronic apparatus 400 may recognize a motion of the passenger handing over the object to another passenger, and accordingly, the electronic apparatus 400 may determine that the object is obtained by the other passenger.

In operation S730, the electronic apparatus 400 may determine as to whether permission for the object is granted. In other words, the electronic apparatus 400 may determine as to whether the passenger, who is the owner of the object, grants permission for the object to the other passenger. According to an embodiment, based on sensing information regarding conversion between the passenger and the other passenger, the electronic apparatus 400 may determine whether the passenger, who is the owner of the object, grants permission for the object to the other passenger. For example, when an expression regarding permission is used in the conversation between the passenger and the other passenger, the electronic apparatus 400 may determine that the passenger, who is the owner of the object, grants permission for the object to the other passenger. According to another embodiment, when the passenger, who is the owner of the object, directly hand over the object to the other passenger, the electronic apparatus 400 may determine that the passenger grants permission for the object to the other passenger.

The sequence of operation S720 and operation S730 in FIG. 7 are merely an example. According to another embodiment, the electronic apparatus 400 may simultaneously perform operation S720 and operation S730. According to yet another embodiment, the electronic apparatus 400 may perform operation S720 after performing operation S730.

When it is determined in operation S730 that permission for the object is granted, the electronic apparatus 400 may change the owner of the object from the passenger to the other passenger in operation S740. When it is determined in operation S720 that the object is not obtained by the other passenger or when it is determined in operation S730 that permission for the object is not granted for the other passenger even though a determination made in operation S720 that the object is obtained by the other passenger, the electronic apparatus 400 may not change the owner of the object in operation S750. In other words, the electronic apparatus 400 may maintain the passenger as the owner of the object.

Figure 8:
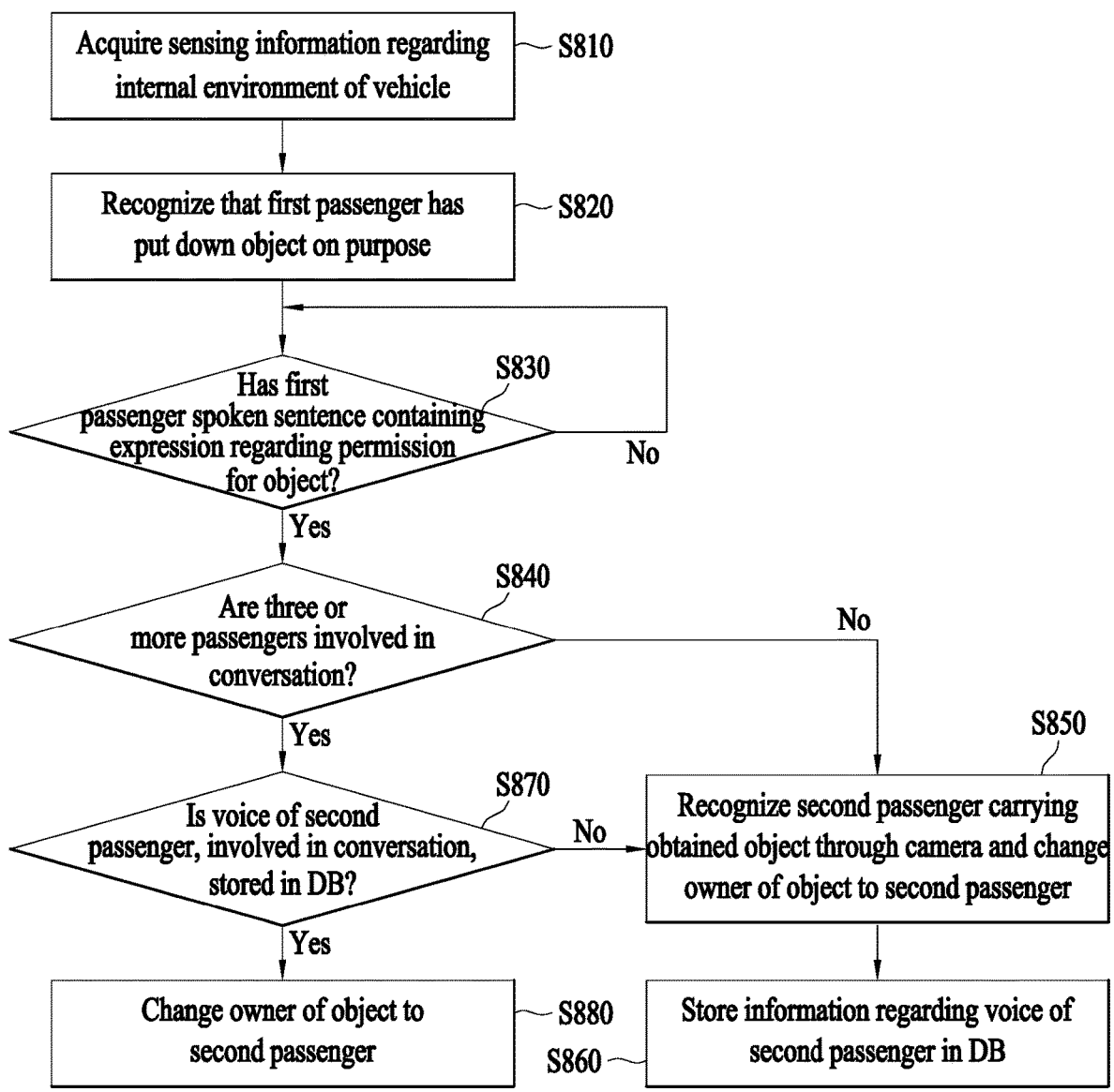
FIG. 8 illustrates another embodiment in which an electronic apparatus changes an owner of an object.

FIG. 8 illustrates another embodiment in which an electronic apparatus changes an owner of an object.

In operation S810, an electronic apparatus 400 may acquire sensing information regarding an internal environment of a vehicle. The electronic apparatus 400 may acquire sensing information regarding an object in the vehicle and sensing information regarding at least one passenger in the vehicle. For example, the electronic apparatus 400 may acquire sensing information regarding a motion of at least one passenger through a camera and may acquire sensing information regarding a voice of at least one passenger through a microphone.

In operation S820, the electronic apparatus 400 may recognize, based on the sensing information acquired in operation S810, that a first passenger, who is the owner of the object, has put down the object on purpose.

In operation S830, the electronic apparatus 400 may determine, based on the sensing information acquired in operation S810, whether the first passenger has spoken a sentence containing an expression regarding permission for the object. Specifically, based on the sensing information acquired in operation S810, the electronic apparatus 400 may determine whether the first passenger has spoken a sentence containing an expression regarding permission for the object during conversation with at least one other passenger. For example, when a word associated with the object and a word associated with permission is included in a sentence spoken by the first passenger, the electronic apparatus 400 may determine that the first passenger has spoken a sentence containing an expression regarding permission.

When it is determined in operation S830 that the first passenger has spoken a sentence containing an expression regarding permission for the object, the electronic apparatus 400 may determine, in operation S840, whether three or more passengers have participated in the conversation.

When it is determined in operation S840 that three or more passengers have participated in the conversation, the electronic apparatus 400 may, in operation S850, recognize a second passenger carrying obtained the object through a camera and change the owner of the object from the first passenger to the second passenger.

In operation S860, the electronic apparatus 400 may store information regarding a voice of the second passenger in a database (DB) of the vehicle or a DB of the electronic apparatus 400.

When it is determined in operation S840 that two or less passengers have participated in the conversation, the electronic apparatus 400 may determine, in operation S870, whether the voice of the second passenger carrying participated in the conversation is stored in the DB of the vehicle or the DB of the electronic apparatus 400. When it is determined in operation S870 that the voice of the second occupant is stored in the DB, the electronic apparatus 400 may change the owner of the object from the first passenger to the second passenger in operation S880.

When it is determined in operation S870 that the voice of the second passenger is not stored in the DB, the electronic apparatus 400 may, in operation S850, recognize the second passenger carrying obtained the object through a camera and change the owner of the object from the first passenger to the second passenger. In operation S860, the electronic apparatus 400 may store information regarding the voice of the second passenger in the DB of the vehicle or the DB of the electronic apparatus 400.

Figure 9:
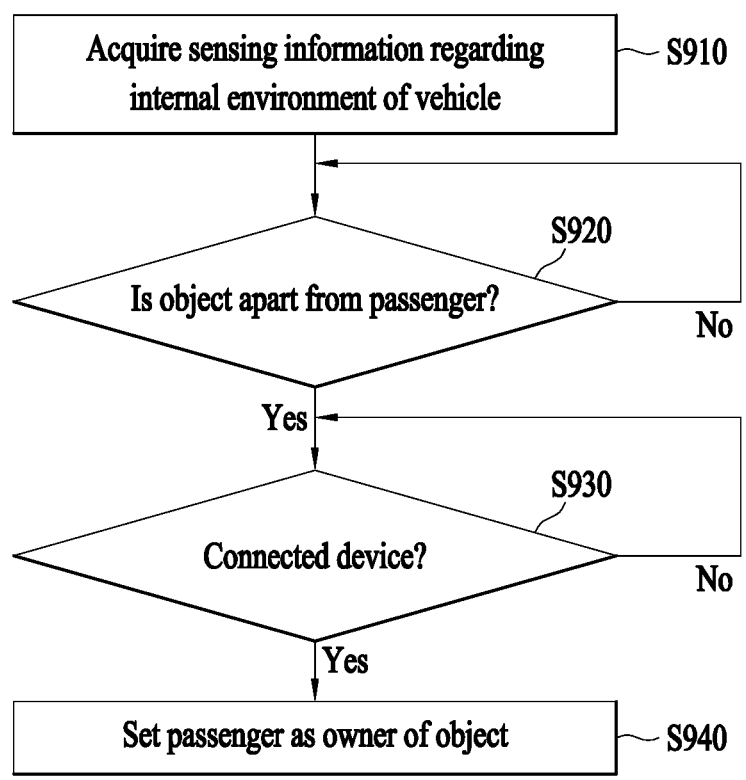
FIG. 9 illustrates another embodiment in which an electronic apparatus sets an owner of an object.

FIG. 9 illustrates another embodiment in which an electronic apparatus sets an owner of an object.

In operation S910, an electronic apparatus 400 may acquire sensing information regarding an internal environment of a vehicle. Specifically, the electronic apparatus 400 may acquire sensing information regarding an object present in the vehicle and sensing information regarding a motion of a passenger carrying the object.

In operation S920, the electronic apparatus 400 may determine, based on the sensing information acquired in operation S910, whether an object comes apart from the passenger. For example, the electronic apparatus 400 may determine whether the passenger has put down the object on purpose, whether the passenger has dropped the object unintentionally, or whether the passenger has handed over the object to another passenger.

When it is determined in operation S920 that the object comes apart from the passenger, the electronic apparatus 400 may determine, in operation S930, whether the object is a connected device. According to an embodiment, the electronic apparatus 400 may determine whether the object apart from the passenger is a connected device in wired or wireless connection with the seat of the passenger. For example, the electronic apparatus 400 may determine whether the object is an earphone in wired or wireless connection with the seat of the passenger. According to another embodiment, the electronic apparatus 400 may determine whether the object apart from the passenger is a connected device in wired or wireless connection with a device possessed by the passenger.

When it is determined in operation S930 that the object is a connected device, the electronic apparatus 400 may set the passenger as the owner of the object in operation S940. In addition, when the object is a connected device, after the passenger is set as the owner of the object, the electronic apparatus 400 may not change the owner of the object to another passenger. In other words, the electronic apparatus 400 may maintain the passenger as the owner of the object. For example, even when the passenger hands over the object to the other passenger after the passenger is set as the owner of the object, the electronic apparatus 400 may not change the owner of the object, and, even when the passenger has granted permission for the object during conversation, the electronic apparatus 400 may not change the owner of the object.

Figure 10:
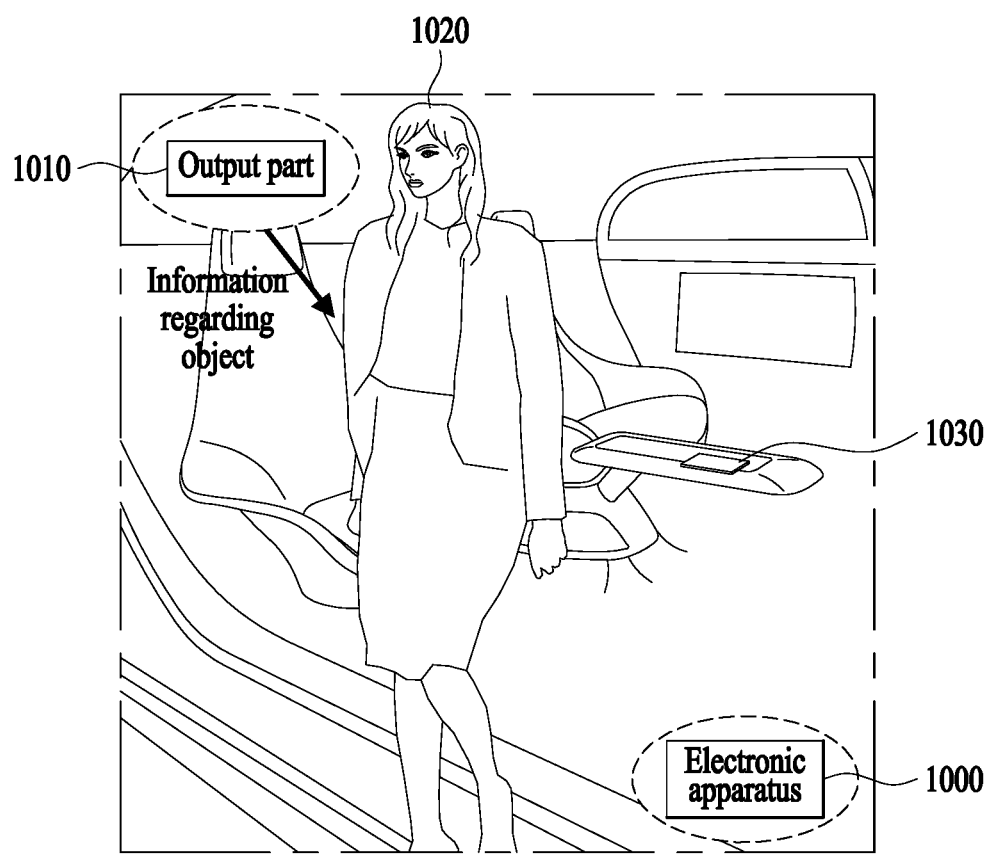
FIG. 10 illustrates an embodiment in which an electronic apparatus provides information regarding an object.

FIG. 10 illustrates an embodiment in which an electronic apparatus provides information regarding an object.

Based on information regarding an internal environment of a vehicle, an electronic apparatus 1000 may recognize a situation in which an object 1030 comes apart from a passenger 1020 and may set the passenger 1020 as the owner of the object 1030.

When the passenger 1020 gets off the vehicle with the object left in the vehicle, the electronic apparatus 1000 may provide information regarding the object 1030 to the passenger 1020 through an output part 1010. Specifically, based on the sensing information regarding the internal environment of the vehicle, the electronic apparatus 1000 may recognize the situation in which the passenger 1020 gets off the vehicle with the object 1030 left in the vehicle, and, in response, the electronic apparatus 1000 may provide the information regarding the object 1030 to the passenger 1020 through the output part 1010. In this case, the electronic apparatus 1000 may control the output part 1010 to provide the passenger 1020 with information indicating that the object 1030 is left in the vehicle. The output part 1010 may be an image output part or audio output part mounted to the vehicle and may provide the passenger 1020 with information regarding the object 1030 through an audio output or an image output.

According to an embodiment, the output part 1010 may be included in the vehicle. According to another embodiment, the output part 1010 may be included in a device possessed by the passenger 1020. According to yet another embodiment, the output part 1010 may be included in the electronic apparatus 1000.

Figure 11:
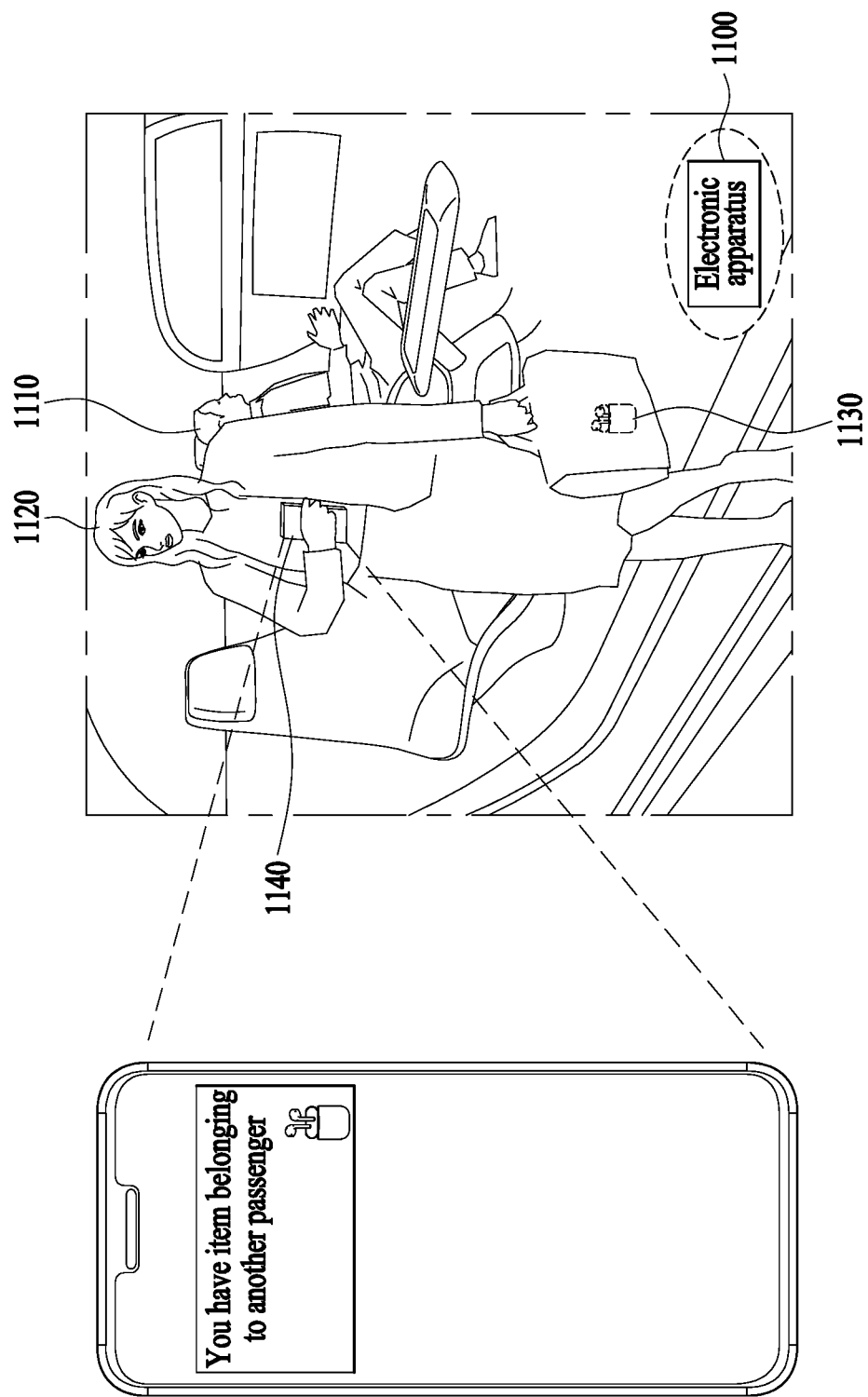
FIG. 11 illustrates another embodiment in which an electronic apparatus provides information regarding an object.

FIG. 11 illustrates another embodiment in which an electronic apparatus provides information regarding an object.

Based on sensing information regarding an internal environment of a vehicle, an electronic apparatus 1100 may recognize a situation in which an object 1130 comes apart from the first passenger 1110 and may set the first passenger 1110 as the owner of the object 1130. In addition, even when a second passenger 1120 has obtained the object 1130 apart from the passenger 1110, the electronic apparatus 1100 may set the first passenger 1110 as the owner of the object 1130.

When the second passenger 1120 rather than the owner of the object 1130 unintentionally gets off the vehicle while carrying the object 1130, the electronic apparatus 1100 may provide information regarding the object 1130 to the second passenger 1120 through a device 1140. For example, the second passenger 1120 may unintentionally get off the vehicle with the object 1130 owned by the first passenger 1110, and the electronic apparatus 1100 may control a display of the device 1140 of the second passenger 1120 to provide the second passenger 1120 with information indicating "You have an item belonging to another passenger."

When the second passenger 1120, rather than the owner of the object 1130, gets off the vehicle while carrying the object 1130, the electronic apparatus 1100 may provide with information regarding the object 1130 to the first passenger 1110 through an output part included in the vehicle or in the device 1140 of the first passenger 1110. For example, through the output part included in the vehicle or the device 1140 of the first passenger 1110, the electronic apparatus 1100 may provide the first passenger 1110 with information indicating "Another passenger is getting off with your item."

Figure 12:
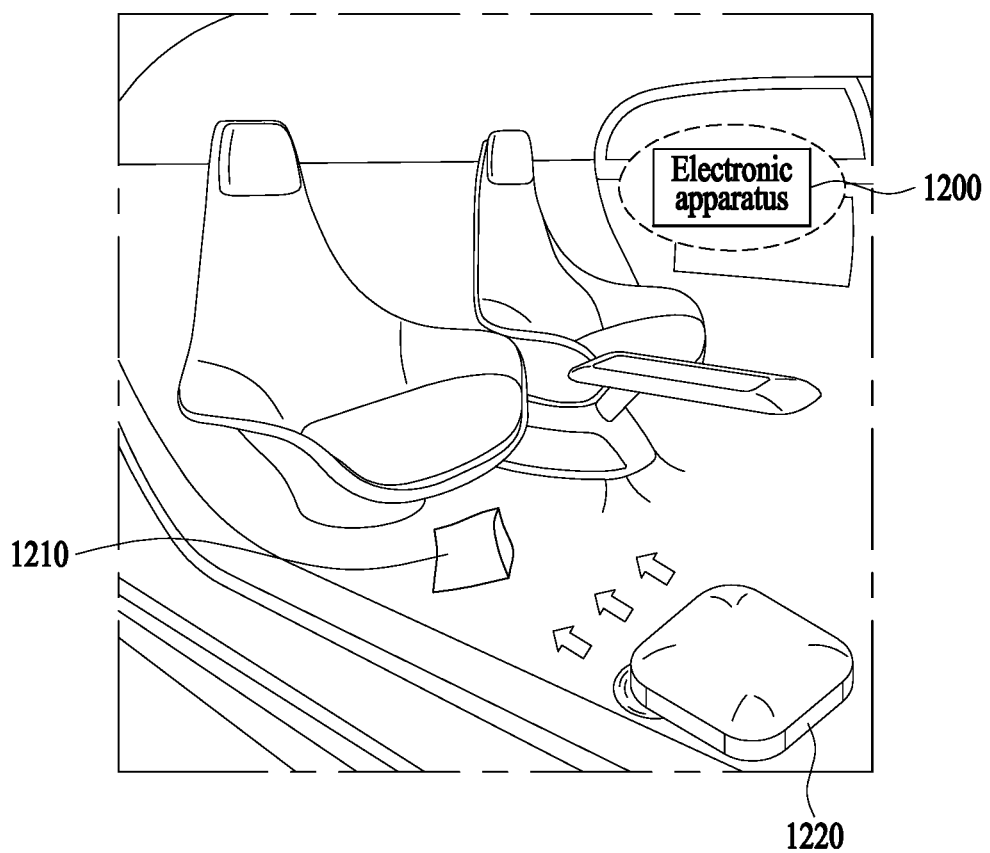
FIG. 12 illustrates another embodiment in which an electronic apparatus provides information regarding an object.

FIG. 12 illustrates another embodiment in which an electronic apparatus provides information regarding an object.

Based on sensing information regarding an internal environment of a vehicle, an electronic apparatus 1200 may recognize that a passenger abandons an object 1210. Accordingly, the electronic apparatus 1200 may not set the owner of the object 1210.

The electronic apparatus 1200 may transmit information regarding the object 1210 to an external device 1220. According to an embodiment, the electronic apparatus 1200 may transmit location information of the object 1210 to the external device 1220. Based on the location information of the object 1210, the external device 1220 may handle with the object 1210. For example, the object 1210 may be an abandoned waste and the external device 1220 may be a cleaning robot. In this case, the electronic device 1220 may get rid of the object 1210 based on the location information of the object 1210.

Figure 13:
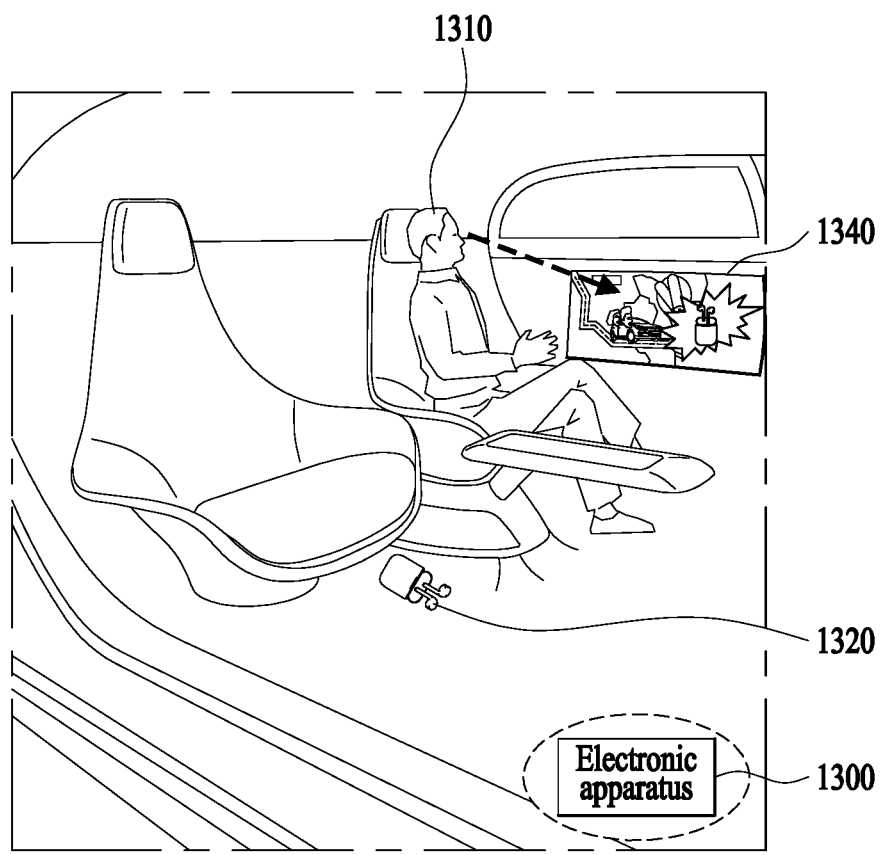
FIG. 13 illustrates another embodiment in which an electronic apparatus provides information regarding an object.

FIG. 13 illustrates another embodiment in which an electronic apparatus provides information regarding an object.

Based on sensing information regarding an internal environment of a vehicle, an electronic apparatus 1300 may recognize a situation in which an object 1320 comes apart from a passenger 1310 and may set the passenger 1310 as the owner of the object 1320. In addition, the electronic apparatus 1300 may recognize that the object 1320 is a connected device in wired or wireless connection with the seat of the passenger. For example, the object 1320 may be an earphone in wired or wireless connection with the seat of the passenger.

The electronic apparatus 1300 may recognize a situation in which the object 1320, which is a connected device, comes apart from the passenger 1310, and the electronic apparatus 1300 may provide the passenger 1310 with information regarding the object 1320. For example, through a display 1340 mounted to the seat of the passenger, the electronic apparatus 1300 may provide the passenger 1310 with information indicating that the object 1320 comes apart from the passenger 1310. According to another embodiment, through an alarm output from a device possessed by the passenger 1310, the electronic apparatus 1300 may provide the passenger 1310 with information indicating that the object 1320 comes apart from the passenger 1310.

Figure 14:
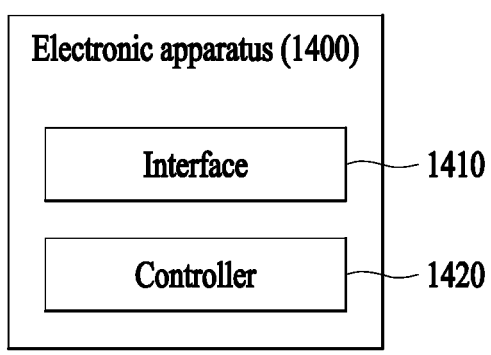
FIG. 14 illustrates a block diagram of an electronic apparatus.

FIG. 14 illustrates a block diagram of an electronic apparatus.

An electronic apparatus 1400 may be included in a vehicle according to an embodiment and may be included in a server according to another embodiment.

According to an embodiment, the electronic apparatus 1400 may include an interface 1410 and a controller 1420. FIG. 14 shows only elements related to the present embodiment in the electronic apparatus 1400. Therefore, those of ordinary skill in the technical field related to the present embodiment will appreciate that general-use elements other than the elements shown in FIG. 14 may be further included.

The interface 1410 may acquire sensing information regarding an internal environment of a vehicle. Specifically, the interface 1410 may acquire sensing information regarding an object present in the vehicle, sensing information regarding a motion of a passenger carrying the object, sensing information regarding a driving state of the vehicle, and sensing information regarding conversation between the passenger and another passenger. According to an embodiment, the interface 1410 may acquire sensing information regarding an internal environment of the vehicle from at least one sensor provided in the vehicle. According to another embodiment, the interface 1410 may acquire sensing information regarding an internal environment of the vehicle from at least one sensor provided in the electronic apparatus 1400. According to yet another embodiment, the interface 1410 may acquire sensing information regarding an internal environment of the vehicle from a memory provided in the electronic apparatus 1400.

The controller 1420 may control overall operations of the electronic apparatus 1400 and process data and signals. The controller 1420 may be configured of at least one hardware unit. In addition, the controller 1420 may operate due to one or more software modules generated by executing program codes stored in a memory.

Based on the sensing information acquired by the interface 1410, the controller 1420 may set the owner of the object when the object comes apart from the passenger. According to an embodiment, based on the acquired sensing information, the controller 1420 may determine whether a motion of the passenger putting down the object has occurred prior to a point in time at which the object comes apart from the passenger. When it is determined the motion of the passenger putting down the object has occurred prior to the point in time, the controller 1420 may set the passenger as the owner of the object. In addition, based on the acquired sensing information, the controller 1420 may determine whether the object is carried by the other passenger and whether an expression regarding permission for the object is used in conversation. When it is determined that the object is being carried by the other passenger and the expression regarding permission for the object is used in the conversation, the controller 1420 may change the owner of the object from the passenger to the other passenger. According to another embodiment, based on the acquired sensing information, the controller 1420 may determine whether a motion of the passenger putting down the object has occurred prior to a point in time at which the object comes apart from the passenger and whether shaking of the vehicle has occurred. When it is determined that the motion of the passenger putting down the object has not occurred and shaking of the vehicle has occurred, the controller 1420 may set the passenger as the owner of the object. According to yet another embodiment, based on the acquired sensing information, the controller 1420 may determine whether a motion of the passenger putting down the object has occurred prior to a point in time at which the object comes apart from the passenger and whether shaking of the vehicle has occurred. When it is determined the motion of the passenger putting down the object has occurred and the shaking of the vehicle has not occurred, the controller 1420 may not set the owner of the object.

Based on the acquired sensing information, the controller 1420 may determine whether a motion of the passenger handing over the object to the other passenger has occurred prior to a point in time at which the object comes apart from the passenger. In this case, when it is determined that the motion of the passenger handing over the object to the other passenger has occurred, the controller 1420 may set the other passenger as the owner of the object.

Based on the acquired sensing information, the controller 1420 may determine whether the object is a connected device in wired or wireless connection with the seat of the passenger. When it is determined that the object is the connected device, the controller 1420 may set the passenger as the owner of the object.

When the owner of the object gets off the vehicle while leaving the object in the vehicle, the controller 1420 may provide the owner of the object with information regarding the object through an output part. The output part may be included in at least one of the vehicle or a device carried by the owner of the object.

When the other passenger rather than the owner of the object gets off the vehicle while carrying the object, the controller 1420 may provide at least one of the owner of the object or the other passenger with information regarding the object through an output part.

According to the present disclosure, it is possible for an electronic apparatus to more accurately set the owner of an object apart from a passenger based on sensing information regarding an internal environment of a vehicle, thereby improving convenience for the passenger. Further, it is possible for the electronic apparatus to determine the intent of the passenger regarding the object apart from the passenger and to set the owner of the object by setting the owner of the object, thereby enabled to more accurately set the owner of the object.

Effects of the present invention that may be obtained in the present invention are not limited to the foregoing effects and any other effects not mentioned herein may be easily understood by a person skilled in the art from the scope of the claims.

The devices in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer readable recording medium as computer readable codes or program commands which may be executed by the processor. Here, the computer readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer readable recording medium may be dispersed to computer systems connected by a network so that computer readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method comprising:
   obtaining sensing information regarding an object present in a vehicle and regarding a motion of a passenger carrying the object;
   setting an owner of the object when the object is separated from the passenger based on the obtained sensing information, wherein the owner of the object is set by:
     determining whether a motion of the passenger putting down the object has occurred prior to a point in time at which the object is separated from the passenger based on the obtained sensing information; and
     setting the passenger as the owner of the object in response to a determination that the motion of the passenger putting down the object has occurred prior to the point in time; and
   presenting the owner of the object with information regarding the object when a predetermined situation occurs.

2. The method of claim 1, wherein the setting of the owner of the object further comprises maintaining the passenger as the owner of the object when another passenger carries the object belonging to the passenger out of the vehicle.

3. The method of claim 1, wherein the sensing information is obtained by obtaining sensing information regarding conversation between the passenger and another passenger; wherein the owner of the object is set by:
   determining whether the object is carried by the another passenger based on the obtained sensing information and whether an expression regarding permission for the object is used in the conversation based on the obtained sensing information, and
   in response to a determination that the object is carried by the another passenger and that the expression regarding the permission for the object is used in the conversation, changing the owner of the object from the passenger to the another passenger.

4. The method of claim 1, wherein the owner of the object is set by:
   determining whether a motion of the passenger handing over the object to another passenger has occurred prior to a point in time at which the object is separated from the passenger based on the obtained sensing information; and
   in response to a determination that the motion of the passenger handing over the object to the another passenger has occurred prior to the point in time, setting the another passenger as the owner of the object.

5. The method of claim 1, wherein the owner of the vehicle is set by:
   determining whether the object corresponds to a connected device based on the obtained sensing information, wherein the connected device includes a wired or a wireless connection with a seat of the passenger; and
   in response to a determination that the object corresponds to the connected device, setting the passenger as the owner of the object.

6. The method of claim 1, wherein presenting the owner with the information regarding the object further comprises presenting the owner of the object with the information regarding the object through an output when the owner of the object exits the vehicle while leaving the object in the vehicle.

7. The method of claim 6, wherein the output is presented through at least one of the vehicle or a device carried by the owner of the object.

8. The method of claim 1, wherein the presenting the owner with the information regarding the object further comprises presenting at least one of the owner of the object or another passenger with the information regarding the object through an output when the another passenger exits the vehicle while carrying the object.

9. A method comprising:
   obtaining sensing information regarding an object present in a vehicle and regarding a motion of a passenger carrying the object, wherein the sensing information is obtained by obtaining sensing information regarding a driving state of the vehicle;
   setting an owner of the object when the object is separated from the passenger based on the obtained sensing information, wherein the owner of the object is set by:
   determining whether a motion of the passenger putting down the object has occurred prior to a point in time at which the object is separated from the passenger based on the obtained sensing information and whether a shaking of the vehicle occurs prior to the point in time at which the object is separated from the passenger based on the obtained sensing information, and
   in response to a determination that the motion of the passenger putting down the object has not occurred prior to the point in time and that the shaking of the vehicle has occurred prior to the point in time, setting the passenger as the owner of the object; and
presenting the owner of the object with information regarding the object when a predetermined situation occurs.

10. A method comprising:
obtaining sensing information regarding an object present in a vehicle and regarding a motion of a passenger carrying the object, wherein the sensing information is obtained by obtaining sensing information regarding a driving state of the vehicle;
setting an owner of the object when the object is separated from the passenger based on the obtained sensing information, wherein the owner of the object is set by:
determining whether a motion of the passenger putting down the object has occurred prior to a point in time at which the object is separated from the passenger based on the obtained sensing information and whether a shaking of the vehicle has occurred prior to the point in time at which the object is separated from the passenger based on the obtained sensing information, and
in response to a determination that the motion of the passenger putting down the object has not occurred prior to the point in time and that the shaking of the vehicle has not occurred prior to the point in time, not setting the owner of the object;
presenting the owner of the object with information regarding the object when a predetermined situation occurs; and
transmitting the information regarding the object to an external device.

11. A non-transitory computer-readable recording medium for storing a program, which when executed by one or more processors of a device, cause the device to perform:
obtaining sensing information regarding an object present in a vehicle and regarding a motion of a passenger carrying the object;
setting an owner of the object when the object is separated from the passenger based on the obtained sensing information, wherein the owner of the object is set by:
determining whether a motion of the passenger putting down the object has occurred prior to a point in time at which the object is separated from the passenger based on the obtained sensing information; and
setting the passenger as the owner of the object in response to a determination that the motion of the passenger putting down the object has occurred prior to the point in time; and
presenting the owner of the object with information regarding the object when a predetermined situation occurs.

12. An apparatus, comprising:
an interface configured to obtain sensing information regarding an object present in a vehicle and regarding a motion of a passenger carrying the object; and
a controller configured to:
set an owner of the object when the object is separated from the passenger based on the obtained sensing information, wherein the owner of the object is set by:
determining whether a motion of the passenger putting down the object has occurred prior to a point in time at which the object is separated from the passenger based on the obtained sensing information; and
setting the passenger as the owner of the object in response to a determination that the motion of the passenger putting down the object has occurred prior to the point in time,
present the owner of the object with information regarding the object through an output when a predetermined situation occurs.

13. The apparatus of claim 12, wherein:
the interface is further configured to further obtain sensing information regarding conversation between the passenger and another passenger; and
the controller is further configured to:
determine whether the object is carried by the another passenger based on the obtained sensing information and whether an expression regarding permission for the object is used in the conversation based on the obtained sensing information, and
in response to a determination that the object is carried by the another passenger and that the expression regarding the permission for the object is used in the conversation, change the owner of the object from the passenger to the another passenger.

14. The apparatus of claim 12, wherein the controller is further configured to present the owner of the object with the information regarding the object through the output when the owner of the object exits the vehicle while leaving the object in the vehicle.

15. The apparatus of claim 12, wherein the output is presented through at least one of the vehicle or a device carried by the owner of the object.

16. The apparatus of claim 12, wherein the controller is further configured to present at least one of the owner of the object or another passenger with the information regarding the object through the output when the another passenger exits the vehicle while carrying the object in the vehicle.

17. An apparatus comprising:
an interface configured to obtain sensing information regarding an object present in a vehicle, a motion of a passenger carrying the object, and a driving state of the vehicle; and
a controller configured to:
set an owner of the object when the object is separated from the passenger based on the obtained sensing information, wherein the owner of the object is set by:
determining whether a motion of the passenger putting down the object has occurred prior to a point in time at which the object is separated from the passenger based on the obtained sensing information and whether a shaking of the vehicle occurs prior to the point in time at which the object is separated from the passenger based on the obtained sensing information, and
in response to a determination that the motion of the passenger putting down the object has not occurred prior to the point in time and that the shaking of the vehicle has occurred prior to the point in time, setting the passenger as the owner of the object; and
present the owner of the object with information regarding the object through an output when a predetermined situation occurs.

18. An apparatus comprising,
an interface configured to obtain sensing information regarding an object present in a vehicle, a motion of a passenger carrying the object, and a driving state of the vehicle; and a controller configured to:
  set an owner of the object when the object is separated from the passenger based on the obtained sensing information, wherein the owner of the object is set by:
determining whether a motion of the passenger putting down the object has occurred prior to a point in time at which the object is separated from the passenger based on the obtained sensing information and whether a shaking of the vehicle has occurred prior to the point in time at which the object is separated from the passenger based on the obtained sensing information, and
in response to a determination that the motion of the passenger putting down the object has not occurred and that the shaking of the vehicle has not occurred prior to the point in time, not setting the owner of the object;
presenting the owner of the object with information regarding the object through an output when a predetermined situation occurs.

* * * * *